US009631058B2

(12) United States Patent
Cote et al.

(10) Patent No.: US 9,631,058 B2
(45) Date of Patent: Apr. 25, 2017

(54) COMPOSITE WOOD PARTICULATE PRODUCTS WITH ALDEHYDE-FREE ADHESIVES AND METHOD FOR MAKING SAME

(71) Applicant: The Willamette Valley Company, Eugene, OR (US)

(72) Inventors: Philip N. Cote, Eugene, OR (US); Omar Tiba, Eugene, OR (US); Wallace K. Rowland, Pleasant Hill, OR (US); Robert J. Rubash, Eugene, OR (US); Randall C. Zenke, Eugene, OR (US); Sudip Chowdhury, Eugene, OR (US)

(73) Assignee: The Willamette Valley Company, Eugene, OR (US)

( * ) Notice: Subject to any disclaimer, the term of this patent is extended or adjusted under 35 U.S.C. 154(b) by 309 days.

(21) Appl. No.: 14/476,502

(22) Filed: Sep. 3, 2014

(65) Prior Publication Data
US 2015/0061177 A1    Mar. 5, 2015

Related U.S. Application Data

(60) Provisional application No. 61/873,237, filed on Sep. 3, 2013.

(51) Int. Cl.
C08L 97/02 (2006.01)
B27N 3/02 (2006.01)
(Continued)

(52) U.S. Cl.
CPC ........... *C08J 5/00* (2013.01); *B27N 3/002* (2013.01); *B27N 3/02* (2013.01); *B27N 3/10* (2013.01);
(Continued)

(58) Field of Classification Search
None
See application file for complete search history.

(56) References Cited

U.S. PATENT DOCUMENTS

| 4,144,205 A | 3/1979 | Hartman et al. |
| 4,279,788 A | 7/1981 | Lambuth |

(Continued)

FOREIGN PATENT DOCUMENTS

| DE | 4229396 A1 | 3/1994 |
| WO | 2010009992 A1 | 1/2010 |

(Continued)

OTHER PUBLICATIONS

European Patent Office, International Search Report and Written Opinion, PCT/US2014/053917, Jan. 22, 2015, pp. 1-8, Rijswijk, The Netherlands.

*Primary Examiner* — Mary F Theisen
(74) *Attorney, Agent, or Firm* — Brinks Gilson & Lione

(57) ABSTRACT

The disclosed composite wood particulate products, adhesives contained in such wood particulate products, and methods of making the adhesive and the wood particulate products employ an aldehyde-free adhesive, and more specifically a formaldehyde-free adhesive. The aldehyde-free adhesive includes an inert additive that extends a resin, such as an isocyanate resin, and forms an evenly dispersed, less expensive polymeric adhesive admixture. The extender-filler of the resin is mixed with water to form a slurry. The slurry can then be mixed with a resin, like the isocyanate resin, to form the adhesive. Various rheology modifiers can be added, if desired, to the extender-filler or the slurry. The adhesive can be blended with wood particles to form a mat that is then pressed into a composite wood particulate product.

16 Claims, 6 Drawing Sheets

(51) Int. Cl.
  *B27N 3/10*   (2006.01)
  *C08J 5/00*   (2006.01)
  *B27N 3/00*   (2006.01)
  *C09J 175/04* (2006.01)
  *C08G 18/76*  (2006.01)
  *C08G 101/00* (2006.01)

(52) U.S. Cl.
  CPC .......... *C08G 18/7664* (2013.01); *C08L 97/02* (2013.01); *C09J 175/04* (2013.01); *C08G 2101/00* (2013.01); *C08J 2375/04* (2013.01); *C08J 2397/02* (2013.01)

(56) References Cited

U.S. PATENT DOCUMENTS

| | | | |
|---|---|---|---|
| 4,407,771 A * | 10/1983 | Betzner | B27N 1/00 264/115 |
| 4,801,631 A | 1/1989 | Sach et al. | |
| 5,407,980 A | 4/1995 | Pizzi et al. | |
| 6,352,661 B1 | 3/2002 | Thompson et al. | |
| 6,531,210 B1 * | 3/2003 | Englert | C04B 11/024 428/304.4 |
| 8,293,821 B1 | 10/2012 | Tillman | |
| 2004/0089418 A1 * | 5/2004 | Li | B27N 3/002 156/296 |
| 2011/0098384 A1 | 4/2011 | Blount | |
| 2011/0210466 A1 * | 9/2011 | Phanopoulos | C07C 265/14 264/128 |
| 2011/0245381 A1 | 10/2011 | Winterowd et al. | |
| 2013/0281622 A1 * | 10/2013 | Umemura | C08L 97/02 524/875 |

FOREIGN PATENT DOCUMENTS

| | | |
|---|---|---|
| WO | 2011097719 A1 | 8/2011 |
| WO | 2012018934 A1 | 2/2012 |

\* cited by examiner

US 9,631,058 B2

COMPOSITE WOOD PARTICULATE PRODUCTS WITH ALDEHYDE-FREE ADHESIVES AND METHOD FOR MAKING SAME

CROSS REFERENCE TO RELATED APPLICATIONS

This application claims the benefit of co-pending U.S. provisional patent application Ser. No. 61/873,237, filed Sep. 3, 2013, which is herein incorporated by reference in its entirety.

BACKGROUND

Composite wood particulate products, such as particleboard (PB), medium density fiberboard (MDF), and oriented strand board (OSB) can employ formaldehyde-free isocyanate adhesives instead of formaldehyde-containing adhesives such as phenol-formaldehyde, urea-formaldehyde and melamine-formaldehyde resins. Historically, none of these commercial composite wood particulate products manufactured with isocyanate adhesives employ fillers and/or extenders for any purpose.

SUMMARY

It would be desirable to produce composite wood products using aldehyde-free isocyanate adhesives which include fillers and/or extenders. The subject systems and methods include interactive extender-filler-containing polymeric, aldehyde-free, isocyanate adhesives which can readily be employed in the production of composite wood products. These interactive extender-filler-containing polymeric isocyanate adhesives are extremely important since they substantially reduce the relatively high cost of polymeric isocyanate adhesives (as compared to the cost of phenol formaldehyde adhesives). They also include interactive extender-fillers which act as compatibilizers for facilitating the effective and efficient distribution of the water and isocyanate to form a more evenly dispersed polymeric adhesive admixture.

DETAILED DESCRIPTION

In one embodiment, in the application of the interactive extender-filler-containing polymeric, aldehyde-free isocyanate adhesives in the production of composite wood products the addition of water during the adhesive/wood blending process is provided in a manner which facilitates effective and efficient admixing of the water and a polymeric isocyanate adhesive due to the presence of the interactive extender-filler composition. Ultimately, this substantially improves the board properties in spite of the fact that a significant portion of the more costly polymeric, aldehyde-free isocyanate adhesive has been replaced by the substantially less costly interactive extender-filler material which is not an adhesive material but which enhances the adhesive properties of the polymeric isocyanate.

In an embodiment herein, the polymeric isocyanate adhesive is a diisocyanate. In a further embodiment, the polymeric isocyanate adhesive is a tri-isocyanate. In still another embodiment, the polymeric isocyanate adhesive is at least one of a trimethylene diisocyanate, tetramethylene diisocyanate, pentamethylene diisocyanate, or a hexamethylene diisocyanate. In still another embodiment the polymeric isocyanate adhesive can be one or more of the following polymeric isocyanate adhesives: methylene diisocyanate (pMDI), aromatic disiisocyanates such as 2,4 tolylene diisocyanate, and 2,6 tolylene diisocyanate, methylene diphenyldiisocyanates, and polymeric isocyanates based on methylene diisocyanates.

However, polymeric isocyanate adhesives and water do not mix readily. Instead they undergo phase separation.

Figure 1A:
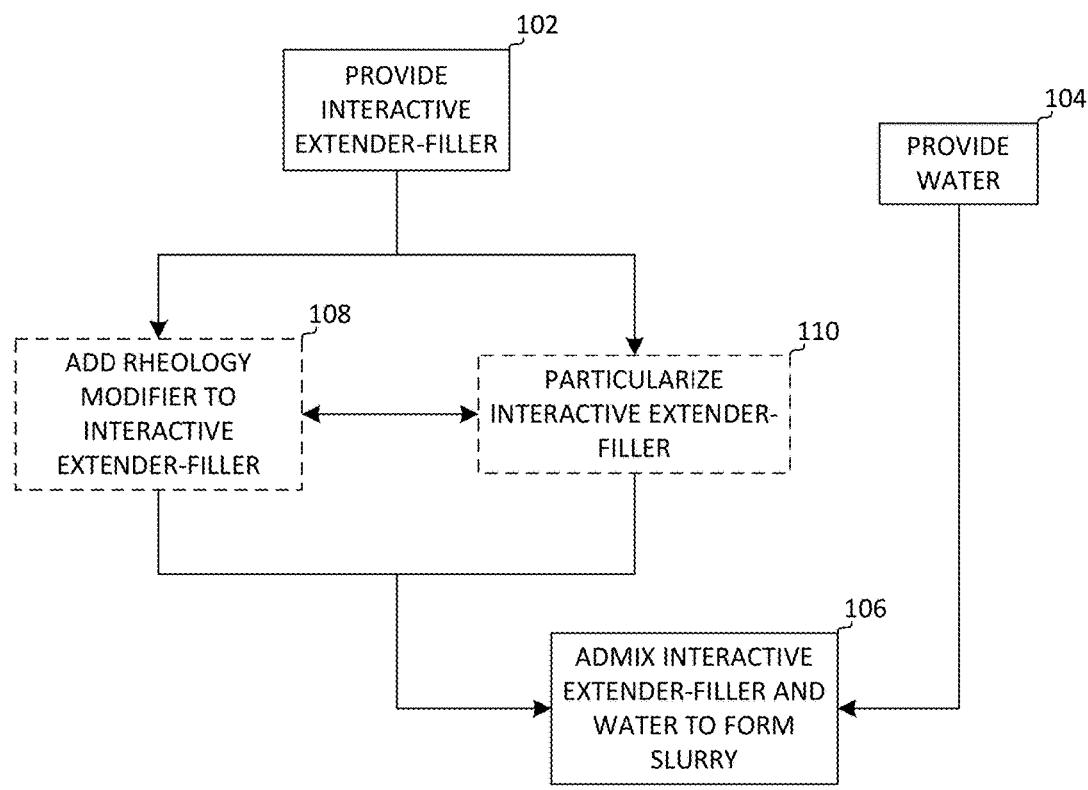
FIG. 1A shows a block diagram of a method of making an interactive extender-filler-water slurry.

FIG. 1A shows a method of producing an interactive extender-filler-water slurry 100. The method 100 can include providing an interactive extender-filler 102 and providing water 104. The method 100 further includes admixing the interactive extender-filler and water to form the slurry 106. Optionally, a rheology modifier can be added to the interactive extender-filler 108 and/or the interactive extender-filler can be particularized 110.

Figure 1B:
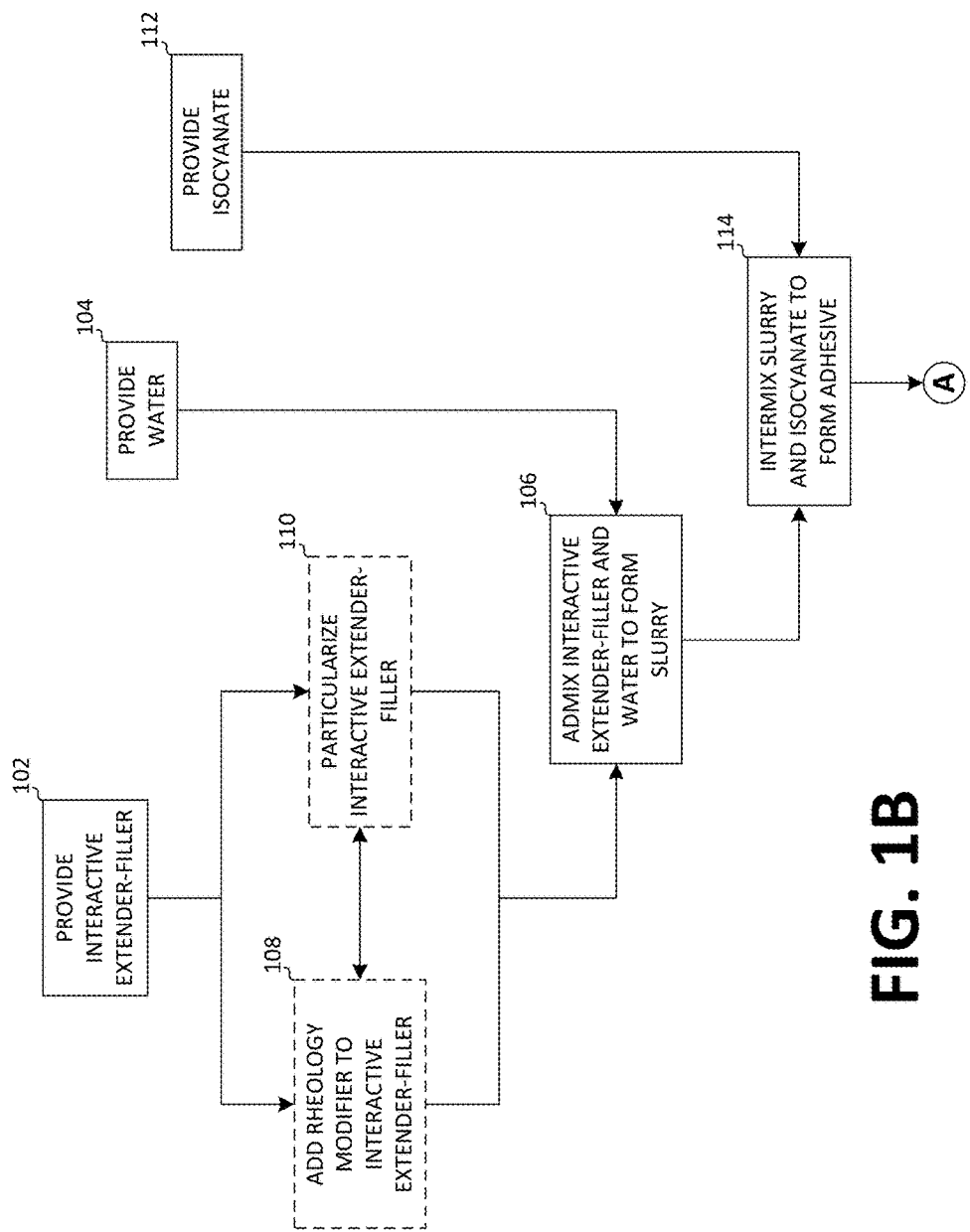
FIG. 1B depicts a block diagram of a method of making an adhesive with the interactive extender-filer-water slurry made by the method shown in FIG. 1A.

FIG. 1B shows a method of producing an interactive, aldehyde-free, extender-filler-water-isocyanate adhesive that can be used in a composite wood particulate product. Producing the adhesive includes the same method steps of FIG. 1A to first form the interactive extender-filler slurry. Isocyanate is provided 112 and then the slurry is then intermixed with the isocyanate to form the adhesive 114.

Figure 1C:
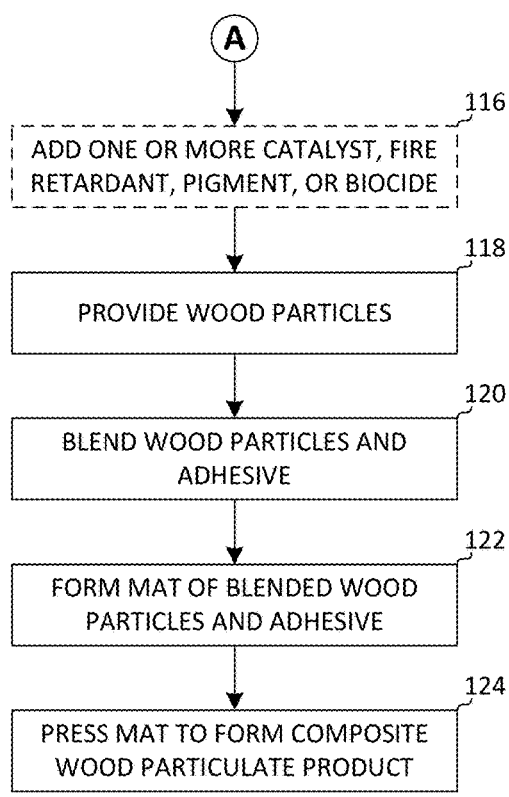
FIG. 1C is another block diagram of a method of making a wood particulate product using an adhesive made by the method shown in FIG. 1B.

FIG. 1C shows a method of producing a wood particulate product that uses the interactive, aldehyde-free, extender-filler-water isocyanate adhesive produced by the method shown in FIG. 1B. To produce the wood particulate product, the wood particles are provided 118 and then are blended with the interactive, aldehyde-free, extender-filler-water isocyanate adhesive 120. The blended wood particles and adhesive form a mat 122 and the mat is then pressed to form the composite wood particulate product 124. Optionally, one or more of a catalyst, fire retardant, pigment, or biocide can be added to the adhesive 116 before it is blended with the wood particles.

The subject interactive extender-filler facilitates uniform mixing of polymeric isocyanate adhesives and water. In an embodiment, it has now been determined that by introducing interactive extender fillers into the water, then mixing the aqueous interactive extender filler mixture with the polymeric isocyanate adhesives, it will facilitate the blending of water with the polymeric isocyanate adhesives.

In another embodiment, the interactive extender-fillers provides for a higher level of compatibility between the water and the polymeric isocyanate adhesives, resulting in better mixing of water and polymeric isocyanate adhesives phase, and thereby better stability of the adhesive system. In a further embodiment, the interactive extender-filler composition acts as a compatibilizer which allows the water to be more effectively distributed throughout the polymeric isocyanate adhesive. This results in more effective mixing of the polymeric isocyanate adhesives and water, which in turn will improve the distribution of polymeric isocyanate adhesives and water throughout a wood particulate product, thereby resulting in improved board panel properties which at the same time substantially reduce the final product cost.

In still another embodiment, the subject method also substantially reduces the over-penetration of the polymeric isocyanate adhesives into the wood particles which form the composite wood product. This further minimizes the amount of polymeric isocyanate adhesives which are employed in the formation of the composite wood product, and in turn significantly increases the cost savings with respect to the production of these products.

In one embodiment, the interactive extender-filler is aged tree bark. In another embodiment, aged alder tree bark is the interactive filler. In a further embodiment, the aged tree bark can be aged softwood bark. In still a further embodiment, the aged softwood bark can be from at least one of the following trees: pine, including but not limited to southern yellow pine, loblolly pine, white pine, ponderosa pine, sugar pine, and lodge pole pine, fir, including but not limited to Douglas fir and grand/white fir, and hemlock, and larch. In a further embodiment, the aged tree bark can be aged hardwood bark. In still a further embodiment, the aged hardwood bark can be from at least one of the following trees: maple, including but not limited to southern red maple, sugar maple, and white maple, oak, including but not limited to red oak, white oak, and yellow oak, luan, mahogany, eucalyptus, acacia, poplar, cottonwood, and aspen.

In one embodiment, the aged tree bark is produced by exposing tree bark to the atmosphere in an open dry area for a predetermined time period. In another embodiment, the aged tree bark is produced by storing tree bark in a dry covered outdoor area to allow moisture to escape from the tree bark. In a further embodiment, the aged tree bark is produced by exposing tree bark to the atmosphere in an open dry area for a predetermined time period and then storing tree bark in a dry covered area to allow moisture to escape from the tree bark.

In one embodiment, the aged tree bark is naturally produced without the addition of chemicals. In another embodiment, the aged tree bark is a dark brown color. In still a further embodiment, the aged tree bark readily breaks apart upon handling by an end user. In yet another embodiment, the aged tree bark has a rotten smell.

The optimal time to produce the aged tree bark varies depending on the species of wood employed and the aging process employed. In one embodiment, aged tree bark has an optimal aging time of at least about 1 week, in another embodiment at least about 3 weeks, and in a further embodiment at least about 6 weeks, in a still another embodiment up to about 16 weeks, in yet another embodiment up to about 12 weeks and in still a further embodiment up to about 9 weeks.

In another embodiment, the aged tree bark is separated from any white wood. In a further embodiment, aged tree bark is dried. In still another embodiment, the aged tree bark is dried to a moisture content of from about 5%, in still a further embodiment, the aged tree bark is dried to moisture content of from about 6%, and in yet another embodiment, the aged tree bark is dried to moisture content of from about 8%. In another embodiment, the aged tree bark is dried to moisture content of up to about 16%, and in still a further embodiment, the aged tree bark is dried to moisture content of up to about 14%, and in yet another embodiment, the aged tree bark is dried to moisture content of up to about 12%.

In an embodiment herein, the dried aged tree bark which is employed to produce the interactive extender-filler is particularized so that it can be readily dispersed in the subject adhesive system. In one embodiment, the interactive extender-filler has an average particle size of up to about 1000 microns, in another embodiment an average particle size of up to about 500 microns, in a further embodiment an average particle size of up to about 400 microns, in still a further embodiment an average particle size of up to about 250 microns, and in still another embodiment an average particle size of from about 30 microns, in a further embodiment an average particle size of from about 50 microns, and in yet another embodiment an average particle size of from about 100 microns.

In one embodiment, the interactive extender-filler is substantially stable in water. In another embodiment, it is compatible with polymeric isocyanate adhesives. In a further embodiment, it prevents precuring of polymeric isocyanate adhesives. In still another embodiment, it exhibits an optimal viscosity profile for improved adhesive distribution during spray application.

In an embodiment, the interactive filler-extender/water slurry is added to the water prior to blending of the water-containing slurry and polymeric isocyanate adhesives. This extends the use of polymeric isocyanate adhesives in the production of composite wood products. Thus, this method of application allows for a reduction in the amount of polymeric isocyanate adhesives which are required to be added to the mixture in order to produce the panel.

In an embodiment herein, the water-polymeric isocyanate adhesives reaction at room temperature is significantly reduced in the presence of interactive extender-fillers in the water phase. This substantially reduces the chance of pre-cure and in turn significantly overcomes potential loss of effective polymeric isocyanate adhesive availability for adhesive bonding purposes.

In an embodiment herein, the interactive extender-filler-water slurry when mixed with polymeric isocyanate adhesive provides unique rheological properties. In another embodiment, it provides excellent high low-shear viscosity. In a further embodiment, it provides outstanding low high-shear viscosity. This rheological profile in one embodiment allows efficient spraying of the adhesive system without significant build-up and clogging of the spraying equipment as well. In still another embodiment it provides for better distribution and higher availability of adhesive at the wood-adhesive bond line. Consequently, this reduces the polymeric isocyanate adhesive requirement while maintaining bond strength.

In yet a further embodiment, a rheology modifier can be added to the interactive extender-filler. In another embodiment, the rheology modifier can be added to the interactive extender-filler slurry.

Rheology modifiers are chemical additives which are used in a formulation to change/modify flow properties of the product. These additives can be inorganic or organic. In an embodiment inorganic rheology modifiers can be a clay material. In another embodiment, organic rheology modifiers can be synthetically produced. In a further embodiment they can be natural products. In still another embodiment the organic rheology modifiers can be synthetic polymers. In still a further case the natural products can be fatty acids, xanthan gum, or grain flours, for example.

In yet another embodiment, one or more of the following rheology modifiers can be used to improve stability, dispersability in water and sprayability:

Clay products such as BENTONE EW-NA ® from Elementis Specialties

Gum products such as guar gum and xantham gum such as KELZAN-S® from CP Kelco.

Cellulosic products such as BERMOCOLL EBS 451 ® from AkzoNobel INC

Grain products such as Wheat Flour, Wheat Bran, Corn Flour, Soy Flour and Oat Fiber Other rheology modifier additives such as BYK-420® from BYK Additives and Instruments Furthermore, in a still further embodiment, the emission of volatile monomeric isocyanate is substantially reduced when the above-described method of making a wood particulate product based on an aldehyde-free adhesive is employed. Moreover, in still another embodiment which is provided by the above-described method, face pitting of the composite wood particulate product is substantially reduced which leads to a smoother surface finish.

As previously stated, an aldehyde-free isocyanate-water-interactive extender-filler is employed herein in making the composite wood particulate products. In one embodiment, the amount of isocyanate employed is from about 10% by weight, in another embodiment from about 15% by weight, in a still further embodiment from about 20% by weight, and in still another embodiment up to about 80% by weight, in a further embodiment up to about 75% by weight, and in a further embodiment up to about 70% by weight. In yet another embodiment, the amount of water employed is from about 10% by weight, in another embodiment from about 15% by weight, in a still further embodiment from about 20% by weight, and in still another embodiment up to about 70% by weight, in a further embodiment up to about 65% by weight, and in a further embodiment up to about 60% by weight. In yet another embodiment, the amount of interactive filler-extender employed is from about 5% by weight, in another embodiment from about 7.5% by weight, in a still further embodiment from about 10% by weight, and in still another embodiment up to about 25% by weight, in a further embodiment up to about 20% by weight, and in a further embodiment up to about 15% by weight.

The polymeric interactive extender filler-water slurry provides a pathway for efficient addition of catalysts, fire retardants, pigments and biocides directly to the polymeric isocyanate adhesive before spraying on the wood furnish.

EXAMPLE

Interactive Extender Filler/Water Slurry Preparation

An exemplary interactive extender filler/water slurry was prepared, as follows:

Blending of dry fillers: An interactive extender filler which was aged alder tree bark having a particle size less than 100 mesh (150 microns) was dry blended with 0.5% (by weight) of a rheology modifier such as Kelzan-S®.

Mixing of the slurry: The interactive extender-filler and Kelzan-S® powder blend were mixed with water at 25% filler to 75% water by weight. The slurry was prepared in the following manner:

Required amount of water was charged in a steel container, attached to a lab disperser.

The interactive extender-filler and Kelzan-S® dry powder blend was then added to the water slowly under constant mixing at 5,000 to 12,000 rpm.

After the addition of powder blend, an additional 10 to 20 minutes of mixing was performed to produce an interactive extender-filler-water slurry.

Particleboard Fabrication

An exemplary particleboard was fabricated employing a polymeric isocyanate adhesive (pMDI) and the above interactive filler-extender/water slurry, as follows:

1. Wood particulate material (furnish) were dried to a moisture content of 3 to 4% by weight based on the weight of the furnish.
2. Required amount of furnish was added to an 18.927 liter (5 gallon) ribbon blender.
3. The pMDI polymeric isocyanate adhesive (Rubinate 1840) and the above described filler/water slurry were loaded into a 1:1 400 ml MIXPAC™ equipped with a static mix tube. The MIXPAC™ is a dual component cartridge, manufactured by Sulzer Ltd., that dispenses two fluids simultaneously at a ratio of 1:1 by volume. The two components are extruded through a long static mix tube with numerous plastic mixing elements which cause turbulent fluid flow thoroughly mixing the two components before exiting the end of the mix tube in the form of a single mixed material.
4. A mechanically driven applicator, manufactured by Albion, is used to dispense the interactive filler-extender/water slurry and pMDI from the MIXPAC™ at a constant dispensing rate (0.025 to 0.05 kg/min), the pMDI and the interactive filler-extender/water slurry were mixed in line and sprayed onto the furnish through a spray nozzle attached to the end of the static mix tube under 69 to 138 kPa (10-20 psi) pressure.
5. The pMDI content in the panel was maintained at up to 3% based on the dry furnish weight.
6. After adhesive application the air was turned off and blending continued for 5 minutes.
7. The blended adhesive and wood furnish was then formed into mats and pressed to ¾ inch thick panels with a target density of 34.6 lbs/cubic ft. The press temperature was set to 176.67° C. (350° F.) and the pressing time was 7 min (including 60 sec to consolidate mat).
8. Finished particleboard was allowed to cool before cutting into 0.051 m by 0.051 m (2 inch×2 inch) specimens for internal bond testing.

Internal Bond Strength

Internal bond testing of the finished particleboard described above was conducted.

Approximately 0.0381 m (1.5 inch) was trimmed off each side of the roughly 0.3048 meter (1 ft) square panels before cutting them into 0.051 m by 0.051 m (2 inch×2 inch) test specimens. Internal bond strengths of the panels were then tested according to ASTM D1037-12. For low density composite particulate wood products, in one embodiment, the internal bond strength is at least about 10 psi, in another embodiment at least about 12 psi, and in a further embodiment at least about 13 psi, and in still another embodiment up to about 22 psi, in still a further embodiment up to about 20 psi, and in yet another embodiment up to about 19 psi. For high density composite particulate wood products, in one embodiment, the internal bond strength is at least about 90 psi, in another embodiment at least about 95 psi, and a further embodiment at least about 100 psi, and in still another embodiment up to about 130 psi, in still a further embodiment up to about 125 psi, and in yet another embodiment up to about 120 psi.

Rheology of Adhesive Systems pMDI and the interactive filler-extender/water slurry were mixed using a static mix tube.

40 ml of mixed adhesive system was loaded into a concentric cylinder cup of a TA Instruments DH-1 Rheometer equipped with a ribbon helical mixing accessory capable of mixing the adhesive system with a precisely-controlled shear rate. The resulting viscosity change was measured in real time.

Specimens were sequentially tested at room temperature as follows:
  a) Mixing at 100 s$^{-1}$ shear rate for 1 hour while measured viscosity at 10 second intervals.
  b) Measured viscosity vs. shear rate after 1 hour mixing.

Figure 2:
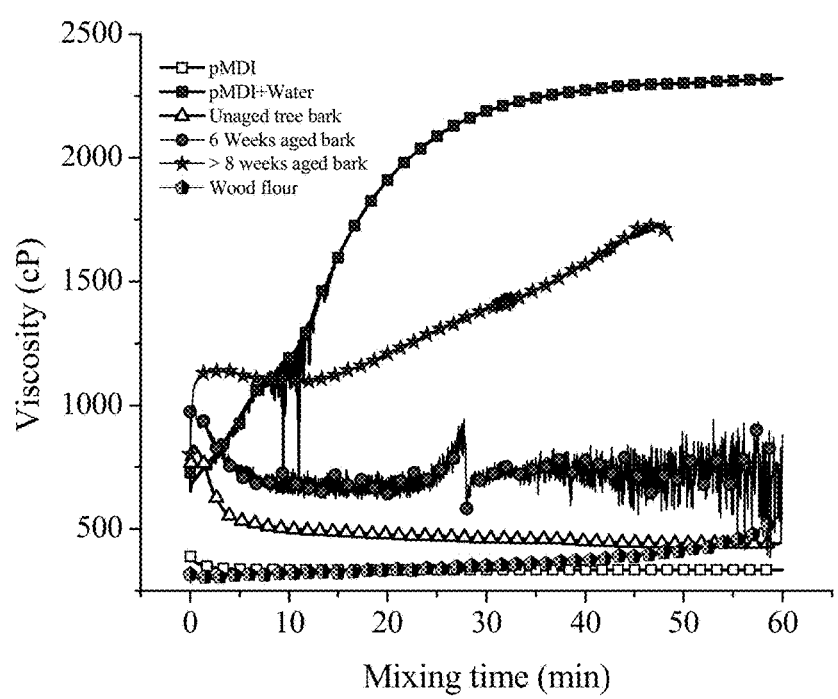
FIG. 2 depicts the mixing rheology of pure pMDI and of a pMDI-water-aged tree bark slurry.

FIG. 2 shows the mixing rheology of pure pMDI and pMDI-interactive extender-filler slurry, respectively. Mixing pMDI with pure water causes a significant increase in the viscosity over time. This is indicative of the severe reaction between pMDI and water which produces polyureas. Therefore, mixing pMDI with water only is not desirable and this will cause pre-mature reaction (pre-cure) and potential reduction in the pMDI availability for bonding.

Contrarily, in the presence of the interactive extender-filler, this pre-cure reaction is dramatically reduced. This conclusion is demonstrated by the data indicating little or no increase in the viscosity over time for adhesive systems which employ an interactive extender-filler. Furthermore, with aging, the blend viscosity of the adhesive system including an interactive extender-filler increases, indicating better compatibility of the pMDI and the water phase. With aging, the hydrophobicity of the subject fillers increases. This makes the aged tree bark fillers relatively more compatible to pMDI phase as compared to un-aged fillers and wood-flour. Aged tree barks thereby provide stability to the pMDI-water emulsion systems in addition to inhibiting the pre-cure reaction. FIG. 2 also shows that with extreme aging (in this case greater than 8 weeks) fillers fail to inhibit the pMDI-water reaction efficiently. Therefore, a controlled aging process is essential to impart required characteristics to the tree bark fillers.

Figure 3:
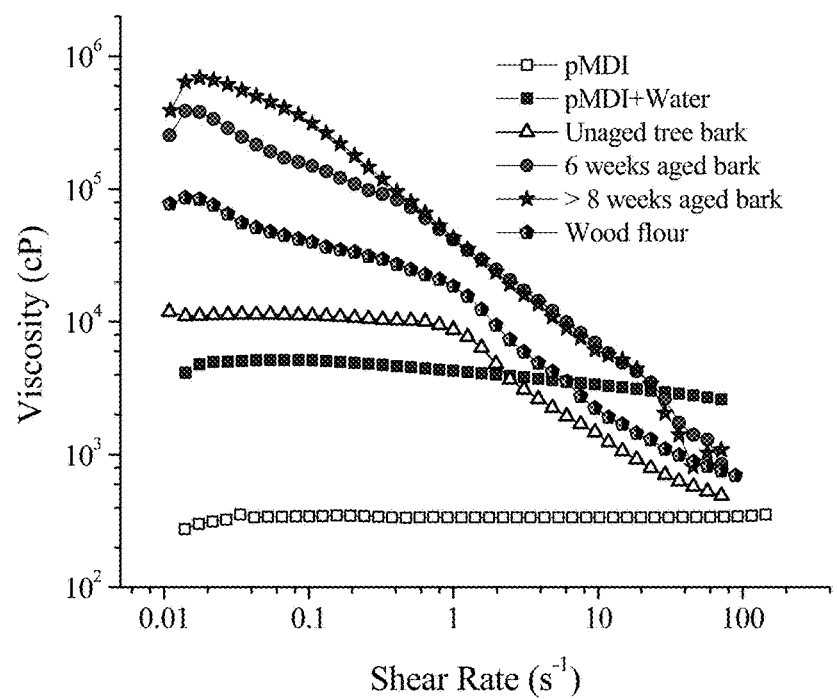
FIG. 3 depicts flow curves for pMDI and pMDI-water-interactive filler systems after 1 hour mixing at 100 s$^{-1}$ shear rate.

FIG. 3 shows flow curves for respective pMDI and pMDI-water-fillers systems after 1 hour mixing at 100 s$^{-1}$ shear rate. These flow curves show that the addition of pure water into pMDI increases its viscosity (see FIG. 2). However, the resultant product does not show any shear thinning (pseudoplastic) behavior under higher shear rate. High shear rate thinning is extremely important for efficient spraying of adhesive during panel fabrication. Addition of the subject fillers imparts significant shear thinning characteristics.

It has also been determined that with increasing aging the extent of shear thinning increases. More specifically, with higher aging the resultant blend shows high low-shear viscosity and low high-shear viscosity. This combination of viscosity properties is very important. The presence of high low-shear viscosity prevents over penetration of adhesive into the wood and consequently more adhesive is available for bonding. Moreover, the presence of low high-shear viscosity enables more efficient spraying without blocking and clogging of the spraying equipment. Therefore, it is evident that the use of an interactive extender-filler, typically in the form of optimally aged tree bark, changes fundamental rheology of the adhesive system, thereby providing less pre-cure, minimizing over penetration of adhesive and providing better adhesive distribution by efficient spraying.

Figure 4:
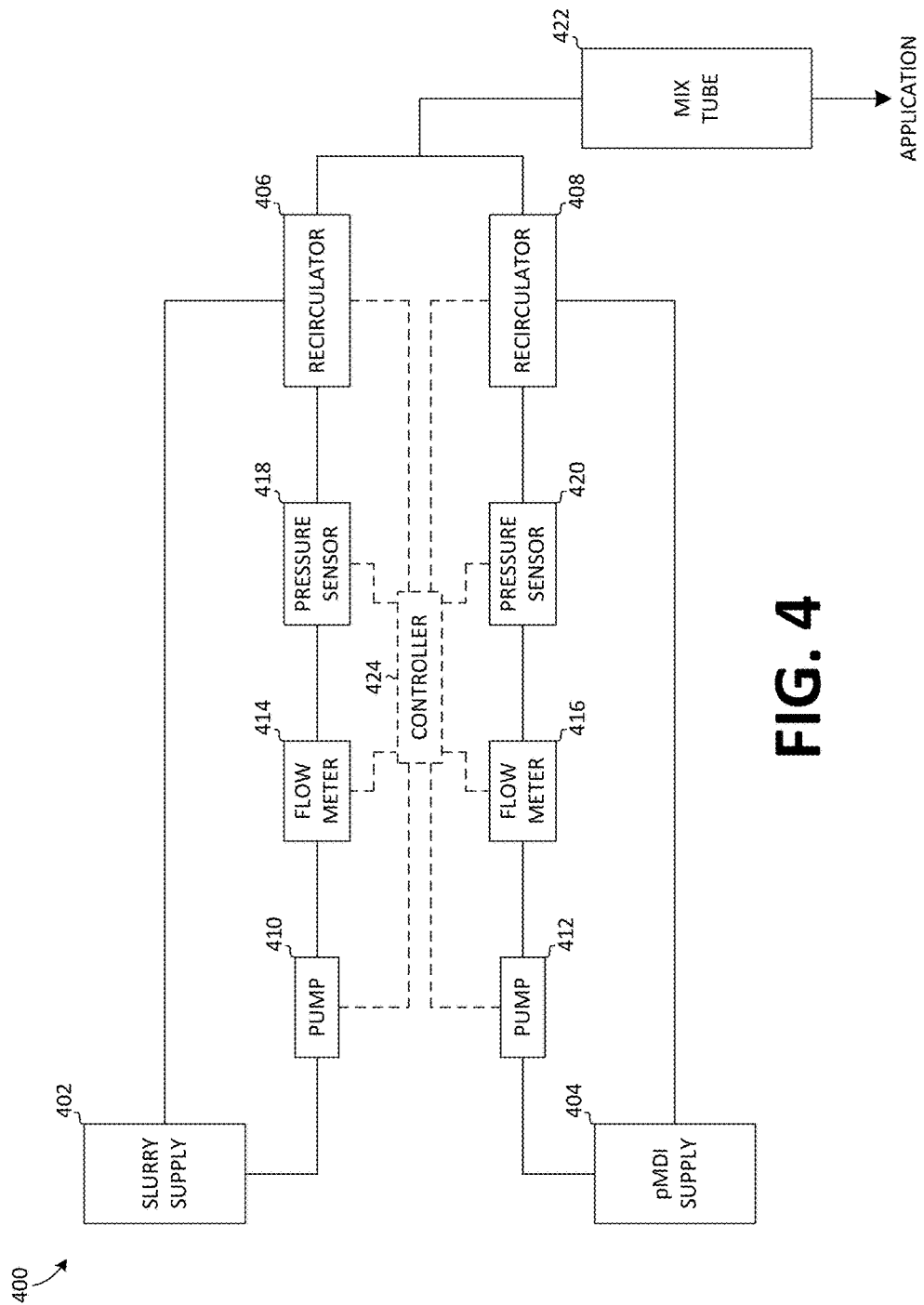
FIG. 4 is a schematic diagram of an exemplary adhesive mixing apparatus.

FIG. 4 shows an example system 400 for producing the adhesives described above. First, the slurry is mixed in the slurry supply 402 that includes the interactive extender-filler and water admixed together, as described above in FIG. 1A. A pMDI supply 404, like any type of isocyanate described above, contains the pMDI that is used to make the adhesive. Each of the slurry supply 402 and the pMDI supply 404 are fed into respective recirculators 406, 408. The respective recirculators 406, 408 each admix the slurry and the pMDI prior to intermix the slurry with the pMDI to make the adhesive.

The supply lines for the slurry and the pMDI have respective pumps 410, 412 that cause the slurry and pMDI, respectively, to cause the slurry and pMDI to exit their respective supplies 402, 404 and move into the recirculators 406, 408, respectively. Respective flow meters 414, 416 are included in each supply line for the slurry and the pMDI that help regulate the flow rate of the slurry through its supply line and the pMDI through its supply line. Further, the slurry and pMDI supply lines each have pressure sensors 418, 420 that regulate the pressure of the slurry and the pMDI, respectively through their respective supply lines. In the example system 400 shown in FIG. 4, the recirculators 406, 408 for each of the slurry and the pMDI produce recirculated slurry and pMDI, respectively, to a mix tube 422 that intermixes the slurry and pMDI to form the adhesive.

It will be appreciated that variations of the above-disclosed systems and methods for producing slurries, adhesives, and wood particulate products, or alternatives thereof, may be desirably combined into many other different systems, methods, or applications. Also various presently unforeseen or unanticipated alternatives, modifications, variations, or improvements therein may be subsequently made by those skilled in the art.

The invention claimed is:

1. A method of producing an adhesive system for use in manufacturing composite wood products comprising:
  introducing water to a mixing container;
  introducing an interactive extender-filler material that has been subjected to a controlled aging process for a time period of about 3 weeks to about 8 weeks to the mixing container;
  mixing the aged interactive extender-filler material with the water to form a slurry; and
  mixing the slurry with an aldehyde-free isocyanate adhesive to form the adhesive system.

2. The production method of claim 1, wherein the interactive extender-filler material is subjected to the controlled aging process for a time period of about 6 weeks to about 8 weeks.

3. The production method of claim 1, wherein the interactive extender-filler material is subjected to the controlled aging process for a time period of about 6 weeks.

4. The production method of claim 1, wherein the interactive extender-filler material comprises tree bark.

5. The production method of claim 4, wherein the tree bark comprises alder tree bark.

6. The production method of claim 1, wherein the aldehyde-free isocyanate adhesive comprises a polymeric isocyanate adhesive.

7. The production method of claim 6, wherein the polymeric isocyanate adhesive is selected from the group consisting of methylene diisocyanate, aromatic diisocyanates, methylene diphenyldiisocyanates, polymeric isocyanates based on methylene diisocyanates, and mixtures thereof.

8. The production method of claim 1, further comprising drying the interactive extender-filler material to a moisture content of up to about 16% after the controlled aging process.

9. A method of producing an adhesive system for use in manufacturing composite wood products comprising:
   subjecting an interactive extender-filler material to a controlled aging process for a time period of about 3 weeks to about 8 weeks;
   mixing the aged interactive extender-filler and water to form a slurry; and
   mixing the slurry with an aldehyde-free isocyanate adhesive to form the adhesive system.

10. The production method of claim 9, wherein the interactive extender-filler material is subjected to the controlled aging process for a time period of about 6 weeks to about 8 weeks.

11. The production method of claim 9, wherein the interactive extender-filler material is subjected to the controlled aging process for a time period of about 6 weeks.

12. The production method of claim 9, wherein the interactive extender-filler material comprises tree bark.

13. The production method of claim 12, wherein the tree bark comprises alder tree bark.

14. The production method of claim 9, wherein the aldehyde-free isocyanate adhesive comprises a polymeric isocyanate adhesive.

15. The production method of claim 14, wherein the polymeric isocyanate adhesive is selected from the group consisting of methylene diisocyanate, aromatic diisocyanates, methylene diphenyldiisocyanates, polymeric isocyanates based on methylene diisocyanates, and mixtures thereof.

16. The production method of claim 9, further comprising drying the interactive extender-filler material to a moisture content of up to about 16% after the controlled aging process.

* * * * *